(12) United States Patent
Oh et al.

(10) Patent No.: US 11,842,279 B2
(45) Date of Patent: Dec. 12, 2023

(54) COMBINATORIAL BAYESIAN OPTIMIZATION USING A GRAPH CARTESIAN PRODUCT

(71) Applicant: QUALCOMM Technologies, Inc., San Diego, CA (US)

(72) Inventors: Changyong Oh, Amsterdam (NL); Efstratios Gavves, Amsterdam (NL); Jakub Mikolaj Tomczak, Diemen (NL); Max Welling, Bussum (NL)

(73) Assignee: QUALCOMM Technologies, Inc., San Diego, CA (US)

( * ) Notice: Subject to any disclaimer, the term of this patent is extended or adjusted under 35 U.S.C. 154(b) by 450 days.

(21) Appl. No.: 16/945,625

(22) Filed: Jul. 31, 2020

(65) Prior Publication Data

US 2021/0034928 A1 Feb. 4, 2021

(30) Foreign Application Priority Data

Jul. 31, 2019 (GR) .............................. 20190100328

(51) Int. Cl.
*G06N 3/082* (2023.01)
*G06F 18/20* (2023.01)
(Continued)

(52) U.S. Cl.
CPC ............. *G06N 3/082* (2013.01); *G06F 18/10* (2023.01); *G06F 18/217* (2023.01); *G06F 18/29* (2023.01); *G06N 7/01* (2023.01)

(58) Field of Classification Search
None
See application file for complete search history.

(56) References Cited

U.S. PATENT DOCUMENTS

| | | | |
|---|---|---|---|
| 2009/0240649 A1* | 9/2009 | Sereni | G06F 16/2425 707/999.005 |
| 2017/0124027 A1* | 5/2017 | Zaribafiyan | G06N 5/01 |
| 2020/0193323 A1* | 6/2020 | Alesiani | G06N 20/00 |

OTHER PUBLICATIONS

Ocenasek J, Schwarz J. The distributed Bayesian optimization algorithm for combinatorial optimization. EUROGEN—Evolutionary Methods for Design, Optimisation and Control, CIMNE. Sep. 2001:115-20. (Year: 2001).*

(Continued)

*Primary Examiner* — Clifford Hilaire
(74) *Attorney, Agent, or Firm* — Patterson & Sheridan LLP

(57) ABSTRACT

Certain aspects provide a method for determining a solution to a combinatorial optimization problem, including: determining a plurality of subgraphs, wherein each subgraph of the plurality of subgraphs corresponds to a combinatorial variable of the plurality of combinatorial variables; determining a combinatorial graph based on the plurality of subgraphs; determining evaluation data comprising a set of vertices in the combinatorial graph and evaluations on the set of vertices; fitting a Gaussian process to the evaluation data; determining an acquisition function for vertices in the combinatorial graph using a predictive mean and a predictive variance from the fitted Gaussian process; optimizing the acquisition function on the combinatorial graph to determine a next vertex to evaluate; evaluating the next vertex; updating the evaluation data with a tuple of the next vertex and its evaluation; and determining a solution to the problem, wherein the solution comprises a vertex of the combinatorial graph.

30 Claims, 11 Drawing Sheets

(51) Int. Cl.
    *G06F 18/10*     (2023.01)
    *G06F 18/21*     (2023.01)
    *G06N 7/01*     (2023.01)

(56) References Cited

OTHER PUBLICATIONS

Fister I, Tepeh A, Fister Jr I. Epistatic arithmetic crossover based on Cartesian graph product in ensemble differential evolution. Applied Mathematics and Computation. Jun. 20, 2016;283:181-94. (Year: 2016).*

Li Y, Campbell C, Tipping M. Bayesian automatic relevance determination algorithms for classifying gene expression data. Bioinformatics. Oct. 1, 2002;18(10):1332-9. (Year: 2002).*

Qiao W, Sipahi R. Rules and limitations of building delay-tolerant topologies for coupled systems. Physical Review E. Jan. 6, 2012; 85(1):016104. (Year: 2012).*

Baptista R, Poloczek M. Bayesian optimization of combinatorial structures. InInternational Conference on Machine Learning Jul. 3, 2018 (pp. 462-471). PMLR. (Year: 2018).*

Wang J, Xu J, Wang X. Combination of hyperband and Bayesian optimization for hyperparameter optimization in deep learning. arXiv preprint arXiv:1801.01596. Jan. 5, 2018. (Year: 2018).*

Oh C, Tomczak J, Gavves E, Welling M. Combinatorial bayesian optimization using the graph cartesian product. Advances in Neural Information Processing Systems. 2019;32. (Year: 2019).*

Thornton C, Hutter F, Hoos HH, Leyton-Brown K. Auto-WEKA: Combined selection and hyperparameter optimization of classification algorithms. InProceedings of the 19th ACM SIGKDD international conference on Knowledge discovery and data mining Aug. 11, 2013 (pp. 847-855). (Year: 2013).*

Kaveh A, Koohestani K. s. Computers & structures. Jun. 1, 2008;86(11-12):1219-31. (Year: 2008).*

Xue, Yuan, and Boting Yang. "The fast search number of a cartesian product of graphs." Discrete Applied Mathematics 224 (2017): 106-119. (Year: 2017).*

Kim J, Kim S, Choi S. Learning to warm-start Bayesian hyperparameter optimization. arXiv preprint arXiv:1710.06219. Oct. 17, 2017. (Year: 2017).*

* cited by examiner

| Method | Contamination Control | | |
|---|---|---|---|
| | $\lambda = 0$ | $\lambda = 10^{-4}$ | $\lambda = 10^{-2}$ |
| SMAC | 21.61±0.04 | 21.50±0.03 | 21.68±0.04 |
| TPE | 21.64±0.04 | 21.69±0.04 | 21.84±0.04 |
| SA | 21.47±0.04 | 21.49±0.04 | 21.61±0.04 |
| BOCS-SDP | 21.37±0.03 | 21.38±0.03 | 21.52±0.03 |
| COMBO | 21.28±0.03 | 21.28±0.03 | 21.44±0.03 |

| Method | Ordinal Variable Problem |
|---|---|
| SMAC | 0.6962±0.0705 |
| TPE | 0.7578±0.0844 |
| SA | 0.4659±0.0211 |
| COMBO | 0.4113±0.0012 |

| Method | Multi-Categorical Variable Problem |
|---|---|
| SMAC | 14.2614±0.0753 |
| TPE | 14.9776±0.0446 |
| SA | 12.7154±0.0918 |
| COMBO | 12.0012±0.0033 |

| Method | wMaxSAT28 | wMaxSAT43 | wMaxSAT60 |
|---|---|---|---|
| SMAC | -20.05±0.67 | -57.42±1.76 | -148.60±1.01 |
| TPE | -25.20±0.88 | -52.39±1.99 | -137.21±2.83 |
| SA | -31.81±1.19 | -75.76±2.30 | -187.55±1.50 |
| BOCS-SDP | -29.49±0.53 | -51.13±1.69 | -153.67±2.01 |
| BOCS-SA3 | -34.79±0.78 | -61.02±2.28[a] | N.A[b] |
| COMBO | -37.80±0.27 | -85.02±2.14 | -195.65±0.00 |

[a] 270 evaluations were not finished after 168 hours.
[b] Not tried due to computation time longer than with MaxSAT43.

Table : (left) Connectivity
(X - no connection, O - states are connected),
(right) Computation type.

|    | In | H1 | H2 | H3 | H4 | H5 | Out |
|----|----|----|----|----|----|----|-----|
| In  | - | O | X | X | X | O | X |
| H1  | - | - | X | O | X | X | O |
| H2  | - | - | - | X | O | X | X |
| H3  | - | - | - | - | X | O | X |
| H4  | - | - | - | - | - | O | O |
| H5  | - | - | - | - | - | - | X |
| Out | - | - | - | - | - | - | - |

|       | MaxPool              | Conv      |
|-------|----------------------|-----------|
| Small | ID ≡ MaxPool(1x1)    | Conv(3x3) |
| Large | MaxPool(3x3)         | Conv(5x5) |

COMBINATORIAL BAYESIAN OPTIMIZATION USING A GRAPH CARTESIAN PRODUCT

CROSS-REFERENCE TO RELATED APPLICATION

This application claims the benefit of and priority to Greek Patent Application No. 20190100328, filed on Jul. 31, 2019, the entire contents of which are incorporated herein by reference.

INTRODUCTION

Aspects of the present disclosure relate to Bayesian Optimization (BO) for objectives on combinatorial search spaces, including ordinal and categorical variables.

Conventional BO methods are focused on continuous rather than combinatorial search spaces. One of the reasons is that the most successful BO methods are built on top of Gaussian Processes (GPs). Because GPs rely on the smoothness defined by a kernel to model uncertainty, they are originally proposed for, and mostly used in, continuous input spaces.

Accordingly, what is needed are methods and systems for applying BO to combinatorial search spaces.

BRIEF SUMMARY

One aspect provides a method for determining a solution to a combinatorial Bayesian optimization problem based on a plurality of combinatorial variables, including: determining a plurality of subgraphs, wherein each subgraph of the plurality of subgraphs corresponds to a combinatorial variable of the plurality of combinatorial variables; determining a combinatorial graph based on the plurality of subgraphs; determining evaluation data comprising a set of vertices in the combinatorial graph and evaluations on the set of vertices; fitting a Gaussian process to the evaluation data; determining an acquisition function for vertices in the combinatorial graph using a predictive mean and a predictive variance from the fitted Gaussian process; optimizing the acquisition function on the combinatorial graph to determine a next vertex to evaluate; evaluating the next vertex; updating the evaluation data with a tuple of the next vertex and its evaluation; and determining a solution to the problem, wherein the solution comprises a vertex of the combinatorial graph.

Another aspect provides a processing system including: a memory including computer-executable instructions; and one or more processors configured to execute the computer-executable instructions and cause the processing system to: determine a plurality of subgraphs, wherein each subgraph of the plurality of subgraphs corresponds to a combinatorial variable of the plurality of combinatorial variables; determine a combinatorial graph based on the plurality of subgraphs; determine evaluation data comprising a set of vertices in the combinatorial graph and evaluations on the set of vertices; fit a Gaussian process to the evaluation data; determining an acquisition function for vertices in the combinatorial graph using a predictive mean and a predictive variance from the fitted Gaussian process; optimize the acquisition function on the combinatorial graph to determine a next vertex to evaluate; evaluate the next vertex; update the evaluation data with a tuple of the next vertex and its evaluation; and determine a solution to the problem, wherein the solution comprises a vertex of the combinatorial graph.

Another aspect provides a non-transitory computer-readable medium including instructions which, when executed by one or more processors of a processing system, cause the processing system to perform a method for determining a solution to a combinatorial Bayesian optimization problem based on a plurality of combinatorial variables, the method including: determining a plurality of subgraphs, wherein each subgraph of the plurality of subgraphs corresponds to a combinatorial variable of the plurality of combinatorial variables; determining a combinatorial graph based on the plurality of subgraphs; determining evaluation data comprising a set of vertices in the combinatorial graph and evaluations on the set of vertices; fitting a Gaussian process to the evaluation data; determining an acquisition function for vertices in the combinatorial graph using a predictive mean and a predictive variance from the fitted Gaussian process; optimizing the acquisition function on the combinatorial graph to determine a next vertex to evaluate; evaluating the next vertex; updating the evaluation data with a tuple of the next vertex and its evaluation; and determining a solution to the problem, wherein the solution comprises a vertex of the combinatorial graph.

Another aspect provides a processing system configured for determining a solution to a combinatorial Bayesian optimization problem based on a plurality of combinatorial variables, including: means for determining a plurality of subgraphs, wherein each subgraph of the plurality of subgraphs corresponds to a combinatorial variable of the plurality of combinatorial variables; means for determining a combinatorial graph based on the plurality of subgraphs; means for determining evaluation data comprising a set of vertices in the combinatorial graph and evaluations on the set of vertices; means for fitting a Gaussian process to the evaluation data; means for determining an acquisition function for vertices in the combinatorial graph using a predictive mean and a predictive variance from the fitted Gaussian process; means for optimizing the acquisition function on the combinatorial graph to determine a next vertex to evaluate; means for evaluating the next vertex; means for updating the evaluation data with a tuple of the next vertex and its evaluation; and means for determining a solution to the problem, wherein the solution comprises a vertex of the combinatorial graph.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
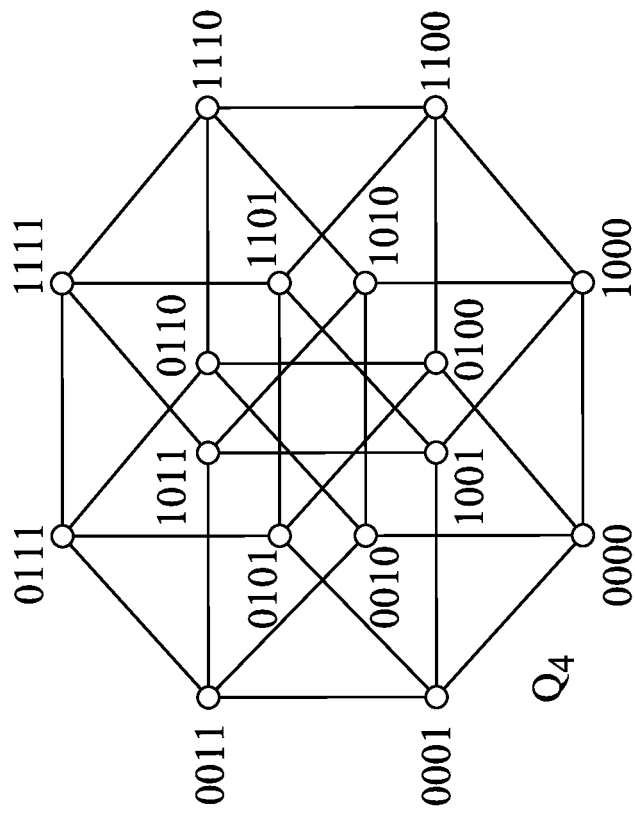
FIG. 1 depicts an example of graph search spaces for binary variables.
Figure 1:
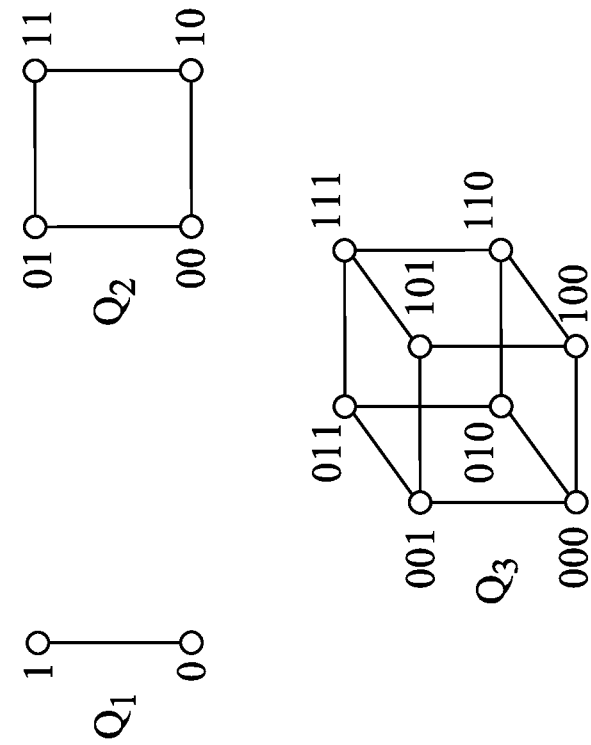

Aspects of the present disclosure provide apparatuses, methods, processing systems, and computer readable mediums for performing Bayesian optimization for objectives on combinatorial search spaces, including ordinal and categorical variables. In particular, described herein is a new Gaussian Process (GP) Bayesian optimization (BO), which quantifies "smoothness" of functions on combinatorial search spaces by utilizing a combinatorial graph. Methods described herein may be referred to generally as combinatorial Bayesian optimization, or "COMBO" for short.

In some embodiments, a vertex set of a combinatorial graph consists of all possible joint assignments of the combinatorial variables, while the edges of the combinatorial graph are constructed using the graph Cartesian product of the subgraphs that represent the individual combinatorial variables.

In some embodiments, the GP uses an automatic relevance determination (ARD) diffusion kernel to model high-order interactions between combinatorial variables, where the diffusion kernel function measures a similarity between two combinatorial vertices in the combinatorial graph.

In some embodiments, a Horseshoe prior is used as a scale parameter in the ARD diffusion kernel to improve the variable selection procedure, which makes methods described herein suitable for high dimensional problems. Critically, methods described herein scale (computationally) linearly instead of exponentially with respect to Graph Fourier Transform (GFT) calculations.

The methods for combinatorial BO described herein have many applications, including finding optimal chipset configurations, navigation, discovering the optimal architecture of a deep neural network, or the optimization of compilers to embed software on hardware optimally, multi-stage optimization of food processing, querying knowledge graphs, manpower planning, job scheduling, manufacturing layout design, vehicle scheduling and routing, and telecommunication network design, to name a few. More generally, the applications in which combinatorial BO is potentially useful generally feature the following properties: (1) they have black-box objectives for which gradient-based optimizers are not amenable, (2) they have expensive evaluation procedures for which methods with low sample efficiency, such as evolution or genetic algorithms, are unsuitable, and (3) they have noisy evaluations and highly non-linear objectives for which simple and exact solutions are inaccurate.

Conventional Bayesian optimization methods have tended to focus on continuous rather than combinatorial search spaces. One of the reasons for this limited application is that the most successful Bayesian optimization methods are built on top of Gaussian Processes (GPs). Because GPs rely on the smoothness defined by a kernel to model uncertainty, they are originally proposed for, and mostly used in, continuous input spaces. Unlike conventional methods, methods described herein have beneficially exploited the relation between the smoothness of graph signals and the smoothness of functions defined on combinatorial structures, which allows for using Bayesian optimization on combinatorial structures.

When considering combinatorial search spaces, the number of possible configurations quickly explodes. For example, for m categorical variables with k categories, the number of possible combinations scales with $O(k^m)$. Applying BO with GPs on combinatorial spaces is, therefore, not straightforward.

Methods described herein provide a novel combinatorial BO designed to tackle the aforementioned problems of lack of smoothness and computational complexity on combinatorial structures. To introduce smoothness of a function on combinatorial structures, a combinatorial graph in implemented. The combinatorial graph comprises sub-graphs, one per categorical (or ordinal) combinatorial variable, which are later combined using a graph Cartesian product. The resulting combinatorial graph contains as vertices all possible combinatorial choices.

FIG. 1 depicts an example of graph search spaces for binary variables. In particular, FIG. 1 depicts four different examples of graph search spaces, for Q=1, 2, 3, and 4, binary variables. As is clear from FIG. 1, the search space rapidly increases in complexity as the number of even simple variables increases.

The smoothness of functions on combinatorial structures, such as depicted in FIG. 1, may be defined to be the smoothness of graph signals using the Graph Fourier Transform (GFT), which is the Eigen-decomposition of a graph Laplacian L(G) where G=(V,E), where V is the set of vertices in the graph, E is the set of edges in the graph.

In some embodiments, a diffusion kernel may be used as the Gaussian process kernel on the graph, such as an automatic relevance determination (ARD) diffusion kernel, for which computing the GFT is computationally tractable via a decomposition of the Eigen-system. With a Gaussian process on a graph, methods described herein account for arbitrarily high order interactions between variables. Moreover, in some embodiments, a sparsity-inducing Horseshoe prior on ARD parameters allows variable selection to scale up to high-dimensional search spaces. Thus, the methods described herein allow for accurate, efficient, and large-scale Bayesian optimization on combinatorial search spaces, which is not provided by conventional methods.

Bayesian Optimization with Gaussian Processes

Generally, Bayesian optimization (BO) aims at finding the global optimum of a black-box function $f$ over a search space X, namely, $x_{opt}=\mathrm{argmin}_{x \in X} f(x)$. At each round, a surrogate model attempts to approximate $f(x)$ based on the evaluations so far, $D=\{(x_i, y_i=f(x_i))\}$. Then an acquisition function suggests the most promising next point $x_{i+1}$ that should be evaluated. The set of already evaluated points D is appended by the new evaluation, such that $D=D \cup (\{x_{i+1}, y_{i+1}\})$. The process may be repeated until an evaluation budget is depleted. In some embodiments, an evaluation budget may be based on a time constraint and/or cost constraint.

An important design choice in Bayesian optimization is the surrogate model that models $f(\bullet)$ in terms of: (1) a predictive mean to predict $f(\bullet)$; and (2) a predictive variance to quantify the prediction uncertainty. With a GP surrogate model, the predictive mean may be expressed as: $\mu(x_* | D) = K_{*D}(K_{DD}+\sigma_n^2 I)^{-1} y$ and the predictive variance may be expressed as: $\sigma^2(x_* | D) = K_{**} - K_{*D}(K_{DD}+\sigma_n^2 I)^{-1} K_{D*}$, where $K_{**}=K(x_*, x_*)$, $[K_{*D}]_{1,i}=K(x_*, x_i)$, $K_{D*}=(K_{*D})^T$, $[K_{DD}]_{i,j}=K(x_i, x_j)$, and $\sigma_n^2$ is the noise variance.

Combinatorial Graphs and Kernels

To design an effective Gaussian process-based Bayesian optimization algorithm on combinatorial structures, generally, a space of smooth functions defined by the Gaussian process (GP) is needed. However, this need can be circumvented by the use of a combinatorial graph that contains all possible combinatorial choices as its vertices for a given combinatorial problem. That is, in such a combinatorial graph, each vertex corresponds to a different joint assignment of categorical or ordinal combinatorial variables. If two vertices are connected by an edge, then their respective set of combinatorial choices differ only by a single combinatorial choice. As a consequence, the notion of smoothness on combinatorial structures can be recast as smoothness of a graph signal defined on the combinatorial graph.

To construct a combinatorial graph, one sub-graph $G(C_i)$ per combinatorial variable $C_i$ may first be determined. In some embodiments, for a categorical variable the sub-graph $G(C_i)$ is chosen to be a complete graph, while for an ordinal variable, the sub-graph $G(C_i)$ is a path graph.

A search space may be built for combinatorial choices, i.e., a combinatorial graph, by combining sub-graphs $G(C_i)$ in such a way that a distance between two adjacent vertices corresponds to a change of a value of a single combinatorial variable. In fact, the graph Cartesian product ensures this property. The graph Cartesian product of subgraphs $G(C_j) = (V_j, E_j)$ is defined as $G=(V,E)=\square_i G(C_i)$, where $\square_i G(C_i)$ represents the graph Cartesian product ($\square$) of all subgraphs $G(C_i)$, and where $V=\times_i V_i$ and $(v_1=(c_1^{(1)}, \ldots, c_N^{(1)}), v_2=(c_1^{(2)}, \ldots, c_1^{(N)})) \in E$ if and only if $\exists_j$ such that $\forall_{i \neq j} c_i^{(1)}=c_i^{(2)}$ and $(c_j^{(1)}, c_j^{(2)}), \in E_j$.

Figure 2:
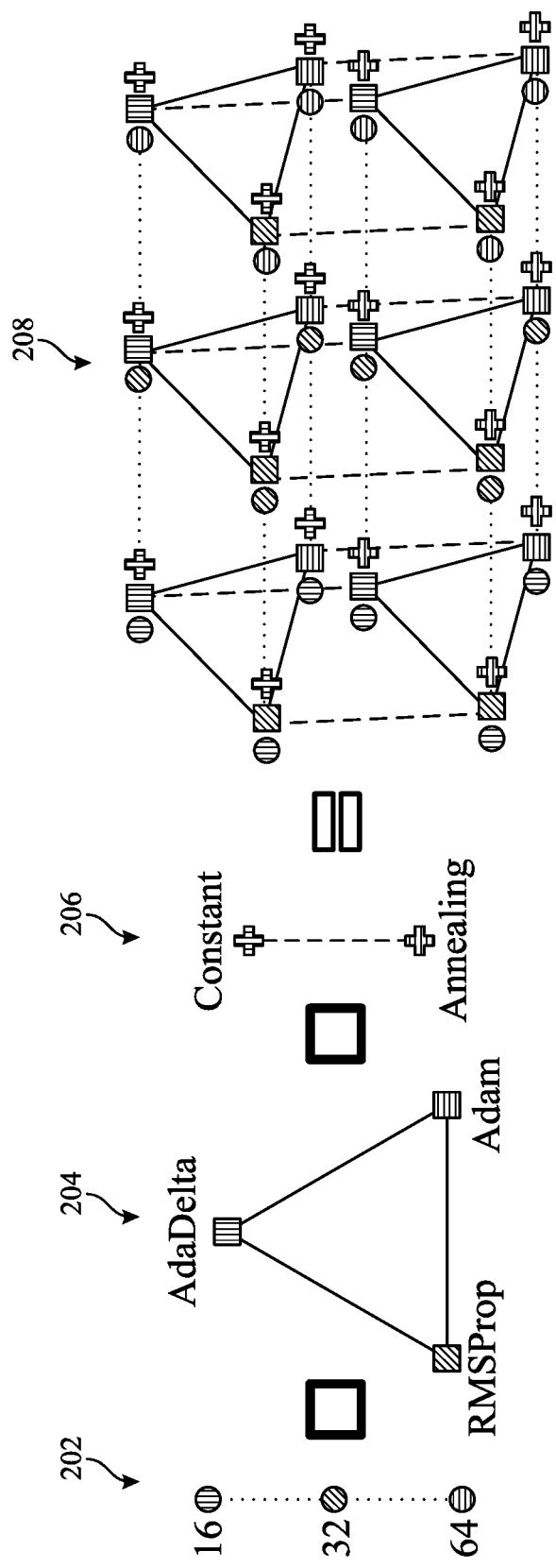
FIG. 2 depicts an example of a combinatorial graph for an example optimization problem.

FIG. 2 depicts an example of a combinatorial graph for an example optimization problem. In particular, FIG. 2 depicts a simplistic hyperparameter optimization problem for learning a neural network with three combinatorial variables: (1) the batch size, $c_1 \in C_1=\{16, 32, 64\}$; (2) the optimizer $c_2 \in C_2=\{\text{AdaDelta, RMSProp, Adam}\}$; and (3) $c_3 \in C_3=\{\text{Constant, Annealing}\}$. In this example, one subgraph of 202, 204, and 206 (i.e., $\{G(C_i)\}_{i=1,2,3}$) is associated with each of the combinatorial variables $\{C_i\}_{i=1,2,3}$. Further in this example, the ordinal batch size variable has a path graph 202, whereas for the categorical optimizer and learning rate annealing variables, there are complete graphs 204 and 206, respectively.

The resulting combinatorial graph 208 is formed based on the graph Cartesian product of each of subgraphs 202, 204, and 206, i.e., $(G(C_1) \square G(C_2) \square G(C_3))$, where $\square$ represents a graph Cartesian product operation, and contains all possible combinations for batch size, optimizer, and learning rate annealing.

In some embodiments, the Hamming distance may be used as distance metric between categorical variables. With all complete subgraphs, the shortest path between two vertices in the combinatorial graph is exactly equivalent to the Hamming distance between the respective categorical choices.

In order to define a Gaussian process surrogate model for a combinatorial problem, a kernel on a combinatorial graph $G=(V,E)$ may be specified. The role of the surrogate model is to smoothly interpolate and extrapolate neighboring data.

To define a smooth function on a graph, i.e., a smooth graph signal $f: V \rightarrow \mathbb{R}$, Graph Fourier Transforms (GFT) from graph signal processing may be used. Similar to Fourier analysis on Euclidean spaces, GFT can represent any graph signal as a linear combination of graph Fourier bases. Suppressing the high frequency modes of the Eigen-decomposition approximates the signal with a smooth function on the graph. Additionally, in some embodiments, a diffusion kernel that penalizes basis-functions in accordance with the magnitude of the frequency may be adopted.

To compute the diffusion kernel on the combinatorial graph G, an Eigen-system of graph Laplacian $L(G)=D_G-A_G$ may be generated, where $A_G$ is the adjacency matrix and $D_G$ is the degree matrix of the graph G. The Eigen-values $\{\lambda_1, \lambda_2, \ldots, \lambda_{|V|}\}$ and Eigen-vectors $\{u_1, u_2, \ldots, u_{|V|}\}$ of the graph Laplacian $L(G)$ are the graph Fourier frequencies and bases, respectively, of combinatorial graph G. Eigen-vectors paired with large Eigen-values correspond to high-frequency Fourier bases.

In some embodiments, a diffusion kernel may be initially defined as:

$$K([p],[q]|\beta) = \sum_{i=1}^{n} e^{-\beta \lambda_i} u_i([p]) u_i([q]) \quad (1)$$

From equation (1), it is clear that higher frequencies, $\lambda_i \gg 1$, are penalized more. In a matrix form, with $\Lambda=\mathrm{diag}(\lambda_1, \lambda_2, \ldots, \lambda_{|V|})$ and $U=[u_1, u_2, \ldots, u_{|V|}]$, the diffusion kernel takes the following form:

$$K(V,V) = U \exp(-\beta \Lambda) U^T \quad (2)$$

Equation (2) is the Gram matrix on all vertices whose submatrix is the Gram matrix for a subset of vertices.

Scalable Combinatorial Bayesian Optimization with the Graph Cartesian Product

The direct computation of a diffusion kernel is difficult because it involves the Eigen-decomposition of the Laplacian $L(G)$—an operation with cubic complexity with respect to the number of vertices $|V|$. This is true even for problems of moderate size. For instance, for 15 binary variables, the Eigen-decomposition complexity is $O(|V|^3)=(2^{15})^3$.

However, as the graph Cartesian product $\square_i G_i$ is relied on to construct the combinatorial graph, properties of the combinatorial graph may be taken advantage of to dramatically increase the efficiency of the Eigen-decomposition of the Laplacian $L(G)$. In particular, due to the structure of the combinatorial graph, a variant of the diffusion kernel can be implemented based on an automatic relevance determination (ARD) diffusion kernel. The ARD diffusion kernel has more flexibility in its modeling capacity. Moreover, in combination with a sparsity-inducing Horseshoe prior, the ARD diffusion kernel performs variable selection automatically that allows for scaling to high dimensional problems.

The graph Cartesian product allows for improvement in the scalability of the Eigen-decomposition. The Laplacian of the Cartesian product of two sub-graphs $G_1$ and $G_2$, $G_1 \Box G_2$, can be algebraically expressed using the Kronecker product $\otimes$ and the Kronecker sum $\otimes$ as follows:

$$L(G_1 \Box G_2) = L(G_1) \otimes L(G_2) = L(G_1) \otimes I_1 + I_2 \otimes L(G_2) \quad (3)$$

In equation (3), above, I denotes the identity matrix. Considering the Eigen-systems $\{(\lambda_i^{(1)}, u_i^{(1)})\}$ and $\{(\lambda_j^{(2)}, u_j^{(j)})\}$ of $G_1$ and $G_2$, respectively, the Eigen-system of $G_1 \Box G_2$ is $\{\lambda_i^{(1)} + \lambda_j^{(2)}, u_i^{(1)} \otimes u_j^{(2)})\}$. Given equation (3), above, and matrix exponentiation, a diffusion kernel K of m combinatorial variables (e.g., categorical or ordinal variables) gives the following:

$$K = \exp(-\beta \oplus_{i=1}^m L(G_i)) = \otimes_{i=1}^m \exp(-\beta L(G_i)) \quad (4)$$

Consequently, the kernel matrix can be computed by calculating the Kronecker product per sub-graph kernel. Specifically, a kernel may be obtained for the ith sub-graph from the Eigen-decomposition of its Laplacian as per Equation (2), above.

Importantly, the decomposition of the final kernel into the Kronecker product of individual kernels in Equation (4) leads to the following proposition. Assume a graph $G = (V,E)$ is the graph Cartesian product of sub-graphs $G = \Box_i G_i$. The graph Fourier Transform of G can be computed in $O(\Sigma_{i=1}^m |V|^3)$ while the direct computation takes $O(\Pi_{i=1}^m |V|^3)$. Thus, computational performance is significantly improved.

In some embodiments, the kernel can be made more flexible by considering individual scaling factors $\{\beta_i\}$, where a single $\beta_i$ applies to each combinatorial variable and associated subgraph. With individual scaling factors, the diffusion kernel K then becomes:

$$K = \exp(\oplus_{i=1}^m -\beta_i L(G_i)) = \otimes_{i=1}^m \exp(-\beta_i L(G_i)) \quad (5)$$

In Equation 5, above, $\beta_i \geq 0$ for $i = 1, \ldots, m$. Since the diffusion kernel is a discrete version of the exponential kernel, the application of the individual $\beta_i$ for each variable is equivalent to the ARD kernel. Hence, variable (sub-graph) selection can be performed automatically. Thus, this kernel is referred to as the ARD diffusion kernel.

To determine $\beta_i$, and to prevent a Gaussian process with an ARD kernel from overfitting, posterior sampling with a Horseshoe prior may be applied on the scaling factors $\{\beta_i\}$. The Horseshoe prior encourages sparsity, and, thus, enables variable selection, which, in turn, makes the methods described herein statistically scalable to high dimensional problems. For instance, if $\beta_i$ is set to zero, then $L(G_i)$ does not contribute in Equation (5), above.

Example Algorithm for Combinatorial Bayesian Optimization on a Combinatorial Graph The following is an example algorithm for combinatorial Bayesian optimization on a combinatorial graph in accordance with the methods described herein.

1: Input: N combinatorial variables $\{C_i\}_{i=1,\ldots,N}$
2: Set a search space and compute Fourier frequencies and bases
3:     Set sub-graphs $G(C_i)$ for each variables $C_i$
4:     Compute eigen-system $\{\lambda_k^{(i)}, u_k^{(i)}\}_{i,k}$ for each sub-graph $G(C_i)$ -continued 5:     Construct the combinatorial graph $G = (V, \varepsilon) = \Box_i G(C_i)$ using graph Cartesian product
6: Initialize D
7: Repeat
8:     Fit GP using ARD diffusion kernel K to D with slice sampling: $\mu(v_*|D), \sigma^2(v_*|D)$
9:     Maximize acquisition function:
    $v_{next} = \operatorname{argmax}_{v_* \in V} \alpha(\mu(v_*|D), \sigma^2(v_*|D))$
10:     Evaluate $f(v_{next})$, append to $D = D \cup \{(v_{next}, f(v_{next}))\}$
11: Until stopping criterion The example algorithm begins with defining all sub-graphs (line 3) based on an input of N combinatorial variables $\{C_i\}_{i=1,\ldots,N}$ (line 1).

Next, a graph Fourier transform (GFT) is calculated for each sub-graph $G(C_i)$ (line 4), whose result is used to compute an ARD diffusion kernel (line 8).

Next, a combinatorial graph is constructed based on the Cartesian graph product of each subgraph, $G = (V, \varepsilon) = \Box_i G(C_i)$, such as shown above in FIG. 2. As above, the ARD diffusion kernel K can be sped up due to the application of the graph Cartesian product (line 5).

Next, Gaussian process surrogate model parameters are fitted using slice sampling (line 8). In some example, slice sampling does a warm-up with 100 burn-in steps and then at every new evaluation, with an updated D, 10 more samples are generated without thinning to approximate the posterior.

In some embodiments, the parameters are sampled from the posterior using slice sampling as follows.

For a nonzero mean function, the marginal likelihood of $D = (V; y)$ is:

$$-\frac{1}{2}(y-m)^T(\sigma_f^2 K_{VV} + \sigma_n^2 I)^{-1}(y-m) - \log \det(\sigma_f^2 K_{VV} + \sigma_n^2 I) - \frac{n}{2}\log 2\pi \quad (6)$$

In Equation 6, above, m is the value of constant mean function. With ARD diffusion kernel, the Gram matrix is given by:

$$\sigma_f^2 K_{VV} + \sigma_n^2 I = \sigma_f^2 \otimes_i U_i \exp^{\beta_i \Lambda_i} U_i^T + \sigma_n^2 I \quad (7)$$

In Equation (7), above, $\Lambda_i$ is a diagonal matrix whose diagonal entries are Eigen-values of a subgraph given to a combinatorial variable $L(G(C_i))$, $U_i$ is an orthogonal matrix whose columns are corresponding Eigen-values of $L(G(C_i))$, $\sigma_f^2$ is signal variance and $\sigma_n^2$ is noise variance.

All Gaussian process parameters may then be sampled from the posterior, which is proportional to the product of above marginal likelihood and priors on all Gaussian process parameters, such as $\beta_i$'s, signal variance $\sigma_f^2$, noise variance $\sigma_n^2$, and constant mean function value m.

In one embodiment, a single step of slice sampling consists of multiple univariate slice sampling steps, including: (1) constant mean function value m; (2) signal variance $\sigma_f^2$; (3) noise variance $\sigma_n^2$; and $\{\beta_i\}_i$, with a randomly shuffled order.

In one embodiment, given $D = (V; y)$, the prior over the mean function may be defined as follows:

$$p(m) \propto \begin{cases} \mathcal{N}(\mu, \sigma^2) & \text{if } y_{min} \leq m \leq y_{max} \\ 0 & \text{otherwise} \end{cases} \quad (8)$$

In Equation 8, above, $\mu = \text{mean}(y)$, $\sigma = (y_{max} - y_{min} = \text{min}(y))$, and $y_{max} = \text{max}(y)$. Thus, Equation 8 represents a truncated Gaussian distribution between $y_{min}$ and $y_{max}$ with a mean at the sample mean of y. The truncation bound is set so that an untruncated version can sample in the truncation bounds with the probability of approximately 0.95.

In one embodiment, given D=(V; y), the prior over the log-variance may be defined as follows:

$$p(\log(\sigma_f^2)) \propto \begin{cases} \mathcal{N}(\mu, \sigma^2) & \text{if } \frac{\sigma_y^2}{K_{VVmax}} \leq \sigma_f^2 \leq \frac{\sigma_y^2}{K_{VVmin}} \\ 0 & \text{otherwise} \end{cases} \quad (9)$$

In Equation 9, above, $\sigma_y^2$=variance(y), $$\mu = \frac{1}{2}\left(\frac{\sigma_y^2}{K_{VVmin}} + \frac{\sigma_y^2}{K_{VVmax}}\right),$$

$$\sigma = \frac{1}{4}\left(\frac{\sigma_y^2}{K_{VVmin}} + \frac{\sigma_y^2}{K_{VVmax}}\right),$$

$K_{VVmin}$=min($K_{VV}$), $K_{VVmax}$=max($K_{VV}$), and $K_{VV}$=K(V,V). Thus, Equation (9) represents a truncated Log-Normal distribution, which is chosen because $\sigma_f^2 K_{VV}$ is the covariance matrix of y with the assumption of a very small noise variance $\sigma_n^2$. Here again, the truncation bounds are set so that an untruncated version can sample in the truncation bounds with the probability of approximately 0.95. Notably, for larger $\sigma_f^2$, the influence of the change in $\sigma_f^2$ becomes weak. Thus, in order to take into account relative amount of change in $\sigma_f^2$, the Log-Normal distribution is used rather than the Normal distribution in this example.

In some embodiments, the Horseshoe prior is used for $\beta_i$ and $\sigma_n^2$ in order to encourage sparsity. Since the probability density of the Horseshoe is difficult, its closed form bound may be used as a proxy according to the following:

$$\frac{K}{2}\log\left(1 + \frac{4\tau^2}{x^2}\right) < p(x) < K\log\left(1 + \frac{2\tau^2}{x^2}\right) \quad (10)$$

In Equation 10, above, $x=\beta_i$ or $x=\sigma_n^2$, $\tau$ is a global shrinkage parameter and $$K = (2\pi^3)^{-\frac{1}{2}}.$$

Typically, the upper bound is used to approximate Horseshoe density. In some embodiments, for $\beta_i$, $\tau$=5 is used to avoid excessive sparsity. In some embodiments, for $\sigma_n^2$, $\tau$=$\sqrt{0.05}$ is used.

In some embodiments, at every new evaluation during sampling, samples of are drawn, and for each $\beta_i$, the sampling procedure includes: (1) setting t=0 and choosing a starting $\beta_i^{(t)}$ for which probability is non-zero; (2) Sample a value q uniformly from [0, $p(\beta_i^{(t)}|D, \beta_{-i}^{(t)}, m^{(t)}, (\sigma_f^2)^{(t)}, (\sigma_n^{(2)})^{(t)}]$; (3) drawing a sample $\beta_i$ uniformly from regions, $p(\beta_i^{(t)}|D, \beta_{-i}^{(t)}, m^{(t)}, (\sigma_f^2)^{(t)}, (\sigma_n^2)^{(t)}) > q$; and (4) setting $\beta_i^{(t+1)} = \beta_i$.

Returning to the example algorithm, next, the acquisition function is maximized to find the next point for evaluation (line 9). Notably, any acquisition function may be used, such as GP Upper Confidence Bound (GP-UBC), Expected Improvement (EI), predictive entropy search, or knowledge gradient, to name a few examples.

In some examples, when initializing D (line 6), an initial evaluation may begin with a first number of randomly selected vertices, such as 20,000 in one example. Then, a second number of vertices with the highest acquisition values, such as 20 in one example, may be used as initial points for acquisition function optimization.

In some embodiments, a breadth-first local search (BFLS) or local greedy search is used such that at a given vertex, acquisition values are compared on adjacent vertices. The vertex with the highest acquisition value of the adjacent vertices is then moved to and the process is repeated until no acquisition value on an adjacent vertex is higher than the acquisition value at the current vertex.

While BFLS is a local search, the initial random search and multi-starts help to escape from local minima. Experiments have shown that BFLS performs on par or better than non-local search, while being more efficient.

Next, the evaluation is updated at line 10. The loop of lines 8-10 then repeats until a stopping criterion is met.

Figure 3:
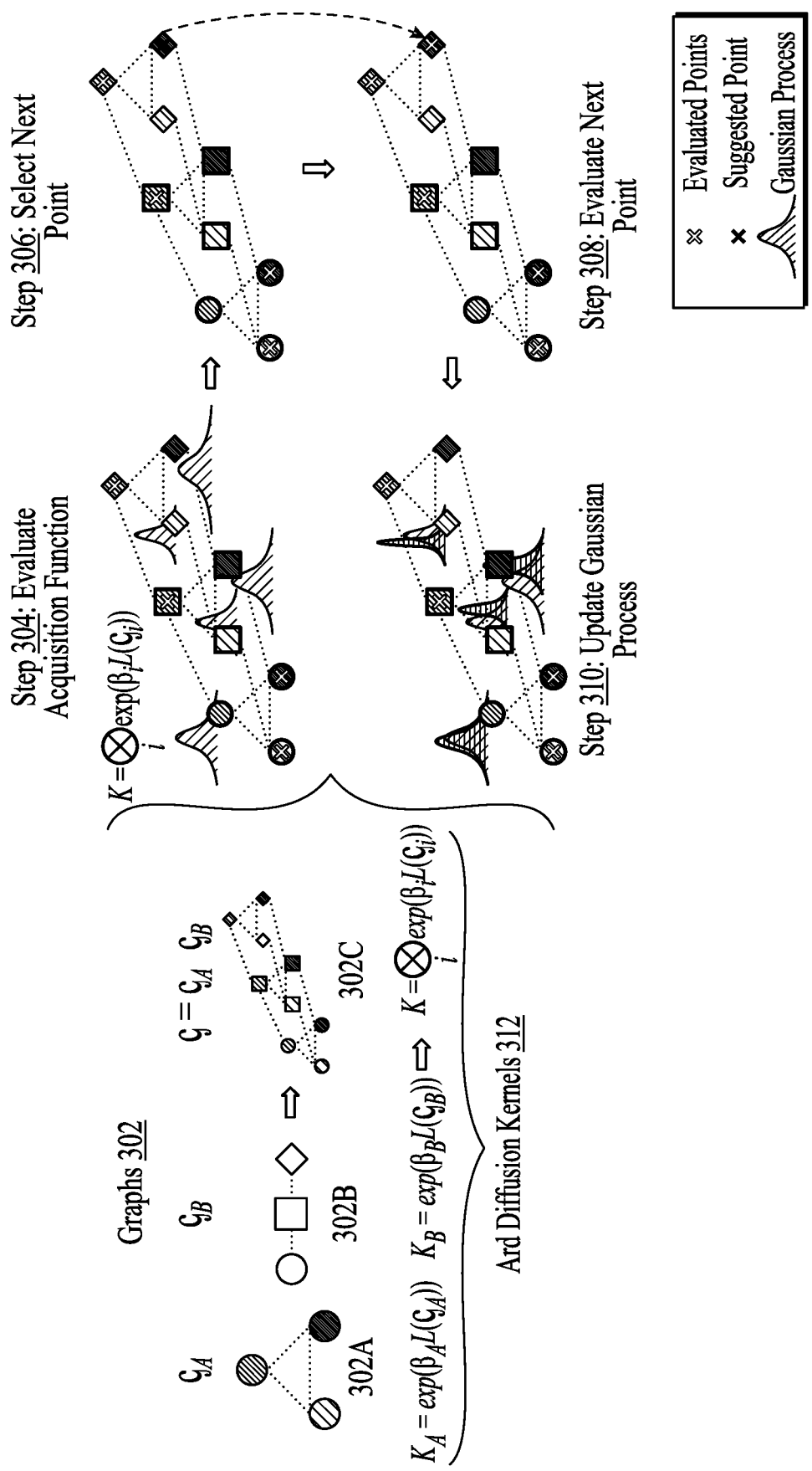
FIG. 3 depicts a visual example of aspects of a combinatorial Bayesian optimization method.

FIG. 3 depicts a visual example of aspects of a combinatorial Bayesian optimization method, as described herein. In the depicted example, subgraphs 302A ($G_A$) and 302B ($G_B$) are combined into combinatorial graph 302C (G), and related ARD diffusion kernels 312 are illustrated.

Step 304 depicts evaluating the acquisition function for the ARD diffusion kernel K in a portion of the process where certain points in the combinatorial graph have already been evaluated. For example, the initially evaluated points may have been selected randomly, as described above.

Then at step 306, a new point is selected based on, for example, a breadth-first local search, as described above.

Then at step 308, the new point that was selected in step 306 is evaluated, as described above.

Finally, at step 310, the Gaussian process is updated, as described above.

Notably, FIG. 3 depicts a snapshot of the methods described herein, for example with respect to the example algorithm above. Ultimately, the process would continue until an optimized solution (e.g., an optimal vertex in the combinatorial graph) is determined, or other stopping criteria have been met. The optimized solution may determine a combination of combinatorial variables that maximizes the acquisition function.

Figure 4:
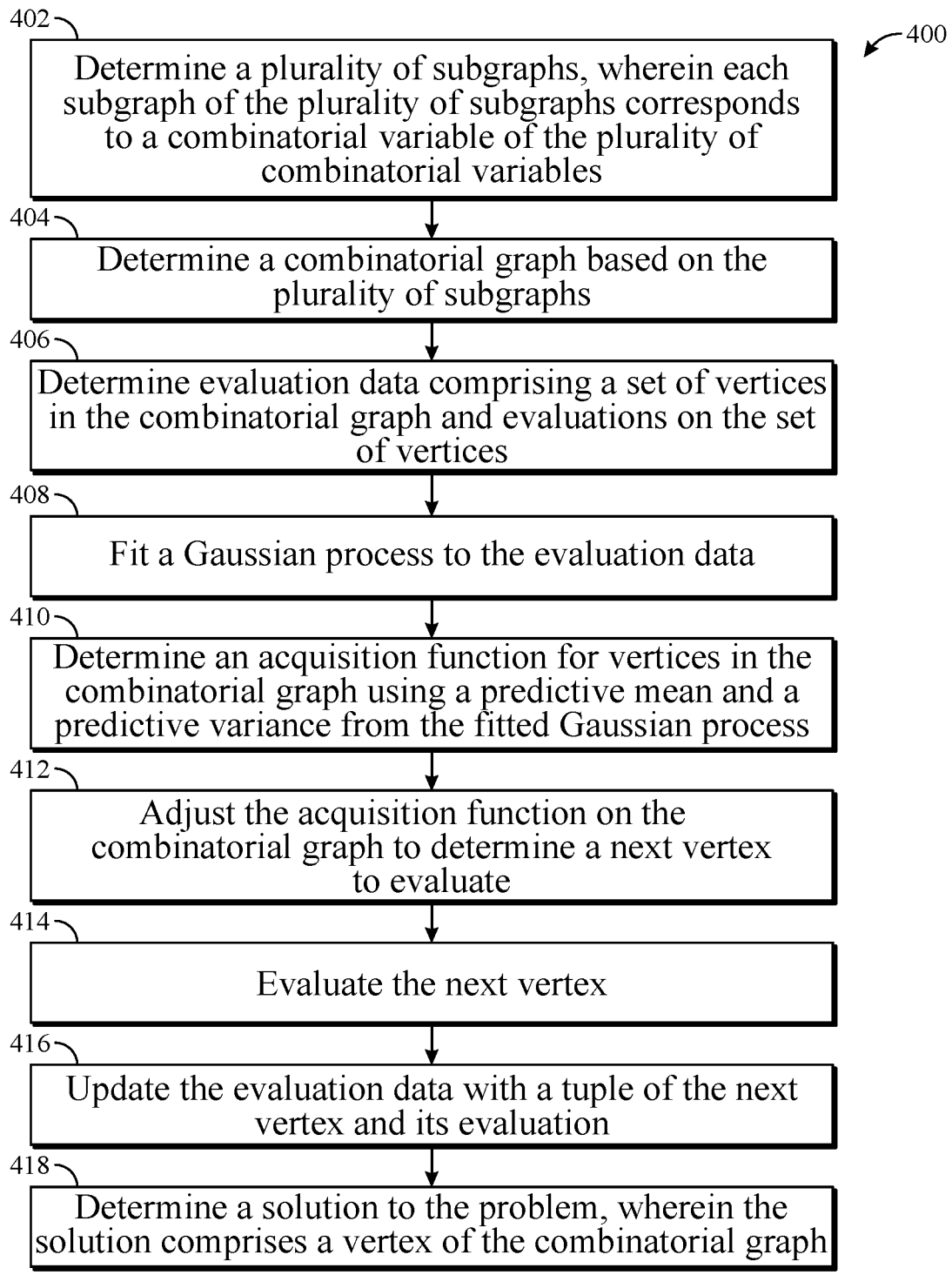
FIG. 4 depicts an example method of combinatorial Bayesian optimization.

FIG. 4 depicts an example method 400 of combinatorial Bayesian optimization, which may be used for determining a solution to a combinatorial Bayesian optimization problem based on a plurality of combinatorial variables. For example, the solution may be a vertex representing an optimized set of combinatorial variables.

Method 400 begins at step 402 with determining a plurality of subgraphs, wherein each subgraph of the plurality of subgraphs corresponds to a combinatorial variable of the plurality of combinatorial variables, such as described above with respect to FIGS. 2 and 3.

Method 400 then proceeds to step 404 with determining a combinatorial graph based on the plurality of subgraphs, such as described above with respect to FIGS. 2 and 3. Generally, the combinatorial graph may comprise a plurality of vertices. In some embodiments, determining a combinatorial graph based on the plurality of subgraphs comprises determining a graph Cartesian product of the plurality of subgraphs.

Method 400 then proceeds to step 406 with determining evaluation data comprising a set of vertices from the plurality of vertices in the combinatorial graph and evaluations on the set of vertices.

Method 400 then proceeds to step 408 with fitting a Gaussian process to the evaluation data. The fitted Gaussian process may comprises a predictive mean and a predictive variance.

Method 400 then proceeds to step 410 with determining an acquisition function for vertices in the combinatorial graph using the predictive mean and the predictive variance from the fitted Gaussian process.

Method 400 then proceeds to step 412 with adjusting the acquisition function on the combinatorial graph to determine a next vertex to evaluate.

Method 400 then proceeds to step 414 with evaluating the next vertex.

In some embodiments, fitting the Gaussian process comprises determining an automatic relevance determination (ARD) diffusion kernel. Further, in some embodiments, determining the ARD diffusion kernel comprises: calculating a graph Fourier transform for each sub-graph of the plurality of subgraphs.

In some embodiments, the plurality of combinatorial variables comprises m combinatorial variables $\{C_i\}_{i=1...m}$, the plurality of subgraphs comprises m subgraphs $\{G_i\}_{i=1...m}$, $\beta$ is a sampled parameter, and the ARD diffusion kernel $K = \otimes_{i=1}^{m} \exp(-\beta L(G_i))$. In some embodiments, $\beta_i$ is a sampled parameter associated with the ith subgraph $G_i$, and the ARD diffusion kernel $K = \otimes_{i=1}^{m} \exp(-\beta_i L(G_i))$.

In some embodiments, fitting the Gaussian process further comprises using slice sampling.

Method 400 then proceeds to step 416 with updating the evaluation data with a tuple of the next vertex and its evaluation.

Method 400 then proceeds to step 418 with determining a solution to the problem, wherein the solution comprises a vertex of the combinatorial graph. The vertex may be provided as an output the combinatorial Bayesian optimization process. In some embodiments, the solution represents a configuration for learning a neural network.

In some embodiments, the set of vertices comprises a random selection from the plurality of vertices in the combinatorial graph.

In some embodiments, method 400 further comprises using a Horseshoe prior as a scale parameter in the ARD diffusion kernel.

The methods described herein have been tested and validated on (1) a plurality of numerical benchmarks and two realistic test cases; (2) the weighted maximum satisfiability problem, where one must find Boolean values that maximize the combined weights of satisfied clauses, that can be made true by turning on and off the variables in the formula; and (3) a neural architecture search problem. These test cases reveal that the methods described herein exceed the performance of all conventional methods. Various example test data is described further with respect to FIGS. 5A-9B.

Example Performance Results Using Combinatorial Bayesian Optimization

Figures 5A, 5B:
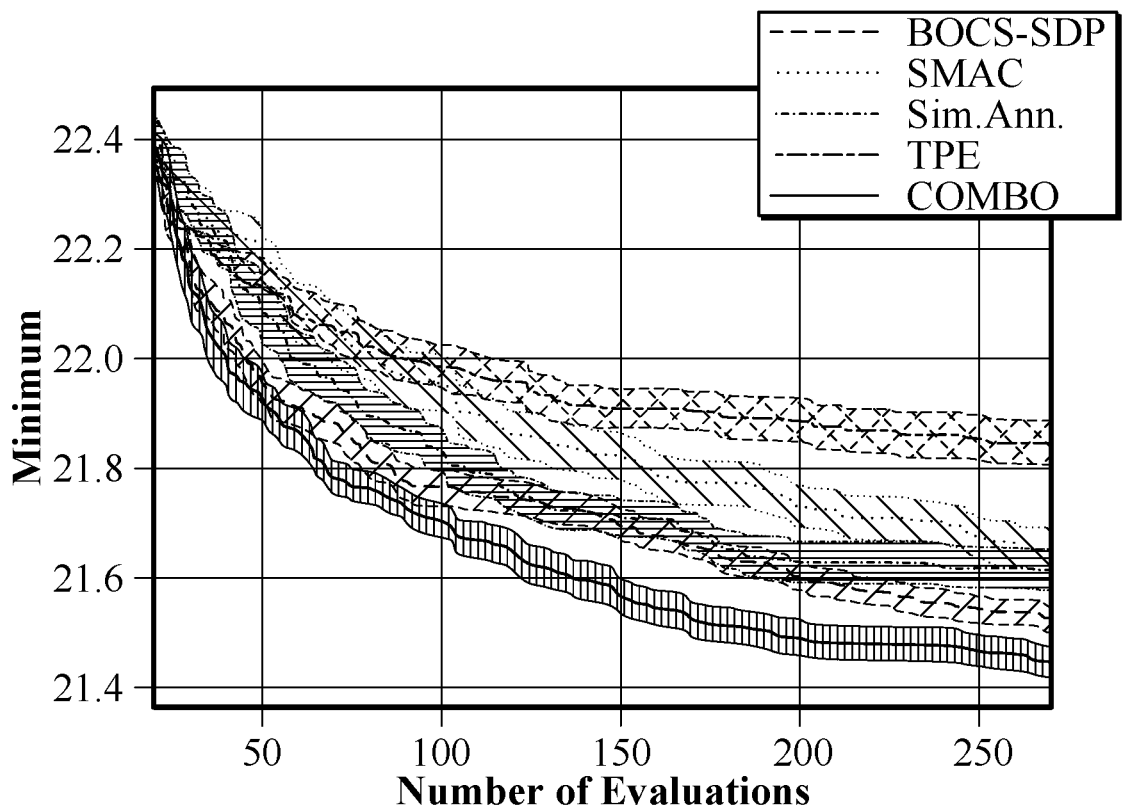
FIGS. 5A and 5B depict example results comparing the methods of combinatorial Bayesian optimization described herein versus other conventional optimization methods for a binary optimization problem.

FIGS. 5A and 5B depict example results comparing combinatorial Bayesian optimization, such as described herein, versus other conventional optimization methods. In particular, FIGS. 5A and 5B relate to an example problem of contamination control in a food supply chain, which is constructed as a binary optimization problem with 21 binary variables ($\approx 2.10 \times 10^6$ configurations). In this example binary optimization problem, one can intervene at each stage of the supply chain to quarantine uncontaminated food with a cost, and the goal is to minimize food contamination while minimizing the prevention cost. In this example, the budget was set to 270 evaluations (e.g., a completion criterion) and 20 random initial points were selected.

FIG. 5A depicts a table of results comparing combinatorial Bayesian optimization against the other tested methods, including sequential model-based algorithm configuration (SMAC), tree of Parzen estimators (TPE), simulated annealing (SA), and BOCS-SDP (an implementation of Bayesian Optimization of Combinatorial Structures that leverages semidefinite programming), and FIG. 5B depicts a graph comparing convergence of combinatorial Bayesian optimization versus the other methods. As is depicted in both FIGS. 5A and 5B, combinatorial Bayesian optimization outperforms all competing methods. Although the optimizing variables are binary, there exist higher order interactions among the variables due to the sequential nature of the problem, showcasing the importance of the modelling flexibility of combinatorial Bayesian optimization.

Figures 6A, 6B:
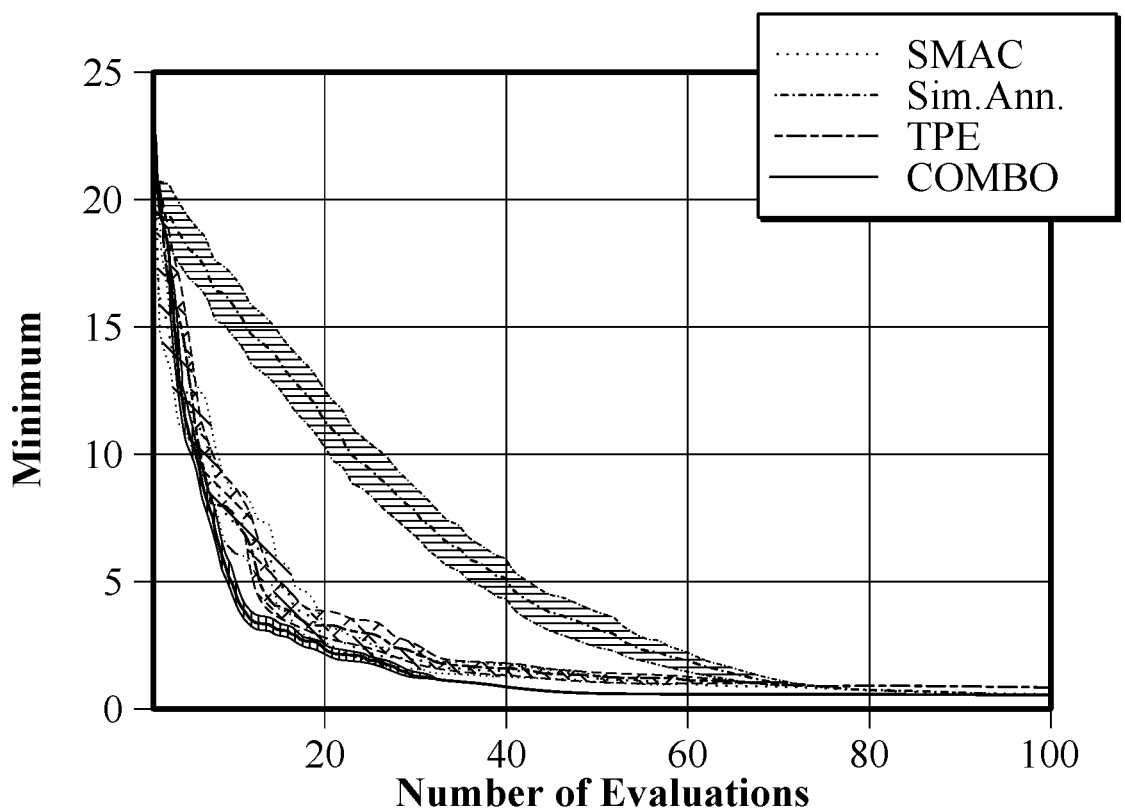
FIGS. 6A and 6B depict further example results comparing the methods of combinatorial Bayesian optimization described herein versus other conventional optimization methods for an optimization problem of a non-linear function over a 2D search space.

FIGS. 6A and 6B depict further example results comparing combinatorial Bayesian optimization, such as described herein, versus other conventional optimization methods. In particular, FIGS. 6A and 6B relate to an example optimization problem of a non-linear function over a 2D search space. In this example, the search space is discretized such that a grid of points is considered that leads to an optimization problem with ordinal variables. In this example, the budget was set to 100 evaluations.

FIG. 6A depicts a table of results comparing combinatorial Bayesian optimization against the other methods, including SMAC, TPE, and SA, and FIG. 6B depicts a graph comparing convergence of combinatorial Bayesian optimization versus the other methods. As is depicted in both FIGS. 6A and 6B, combinatorial Bayesian optimization outperforms all competing methods.

Figures 7A, 7B:
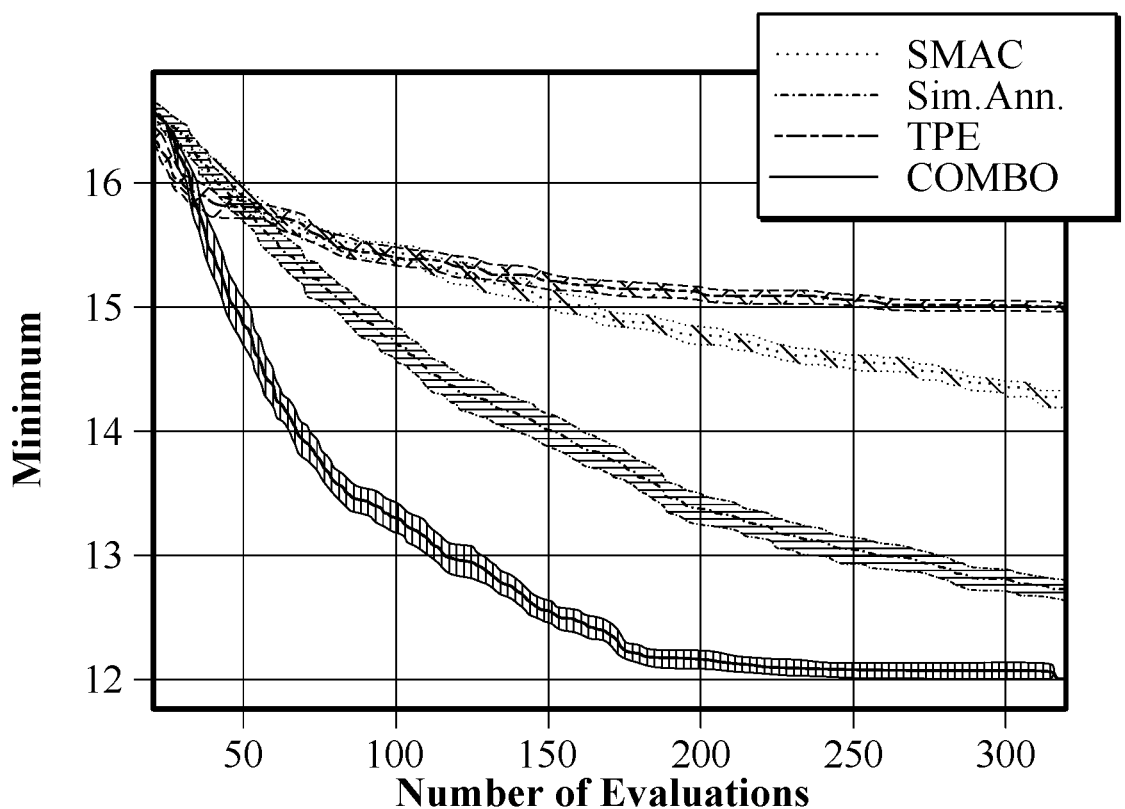
FIGS. 7A and 7B depict further example results comparing the methods of combinatorial Bayesian optimization described herein versus other conventional optimization methods for a multi-categorical variable optimization problem.

FIGS. 7A and 7B depict further example results comparing combinatorial Bayesian optimization, such as described herein, versus other conventional optimization methods. In particular, FIGS. 7A and 7B relate to an example optimization problem including multi-categorical variables.

In this example problem, a pest control officer can choose to use a pesticide from four different companies at a chain of pest control stations, and each pesticide differs in its price and effectiveness relative to the others. Further, the price and effectiveness have the following dynamics. If a pesticide is purchased, then the next purchase of the same pesticide is discounted proportional to the amount that has already been purchased. Further, if a pesticide is used, then pests will acquire a tolerance, which decrease the effectiveness of the pesticide.

For N pest control stations, the search space for this problem is $5^N$, which includes four choices of a pesticide and the choice of not using any of it. In this particular example, 21 pest control stations are considered, each having 5 choices ($\approx 4.77 \times 10^{14}$ combinatorial choices). The budget is set to 320 evaluations, including 20 random initial points.

The table in FIG. 7A and graph in FIG. 7B show that the combinatorial Bayesian optimization method outperforms all methods, including converging faster than other methods.

FIGS. 8A-8E depict further example results comparing combinatorial Bayesian optimization, as described herein, versus other conventional optimization methods. In particular, FIGS. 8A-8E relate to a weighted maximum satisfiability ("MaxSAT") optimization problem.

Generally, satisfiability (SAT) problems involve solving for how to set variables of a Boolean formula to make the formula true. SAT problems are an important type of combinatorial optimization problem because many other optimization problems can be reformulated as a SAT/MaxSAT problem. Further, specialized MaxSAT solvers exist, which makes MaxSAT a useful test case for evaluation of combinatorial Bayesian optimization.

FIGS. 8A-8E show that combinatorial Bayesian optimization, as discussed herein, performs best in all SAT test cases. In particular, combinatorial Bayesian optimization models efficiently handle arbitrarily high order interactions thanks to Gaussian process' nonparametric nature.

Further, with respect to the largest problem, wMaxSAT60, with $\approx 1.15 \times 10^{18}$ configurations, combinatorial Bayesian optimization maintains superior performance due at least in part to the sparsity-inducing properties of the Horseshoe prior used in this test. The Horseshoe prior helps combinatorial Bayesian optimization attain further statistical efficiency.

Figures 8A, 8B:
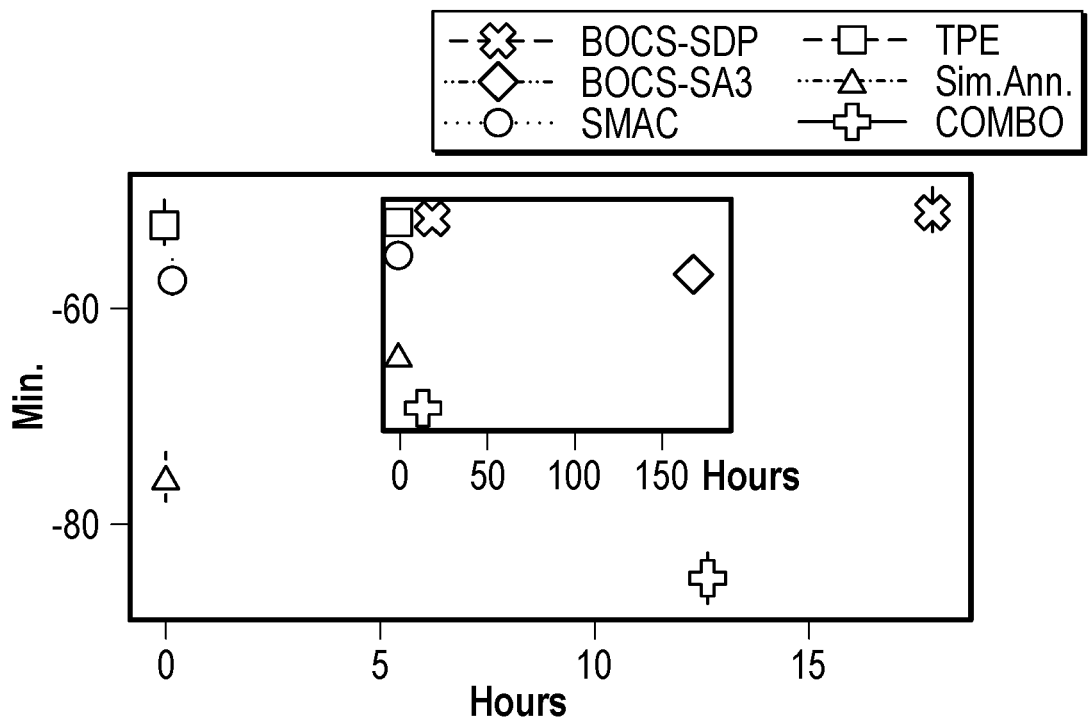
FIGS. 8A-8E depict further example results comparing the methods of combinatorial Bayesian optimization described herein versus other conventional optimization methods for a weighted maximum satisfiability optimization problem.
Figure 8C:
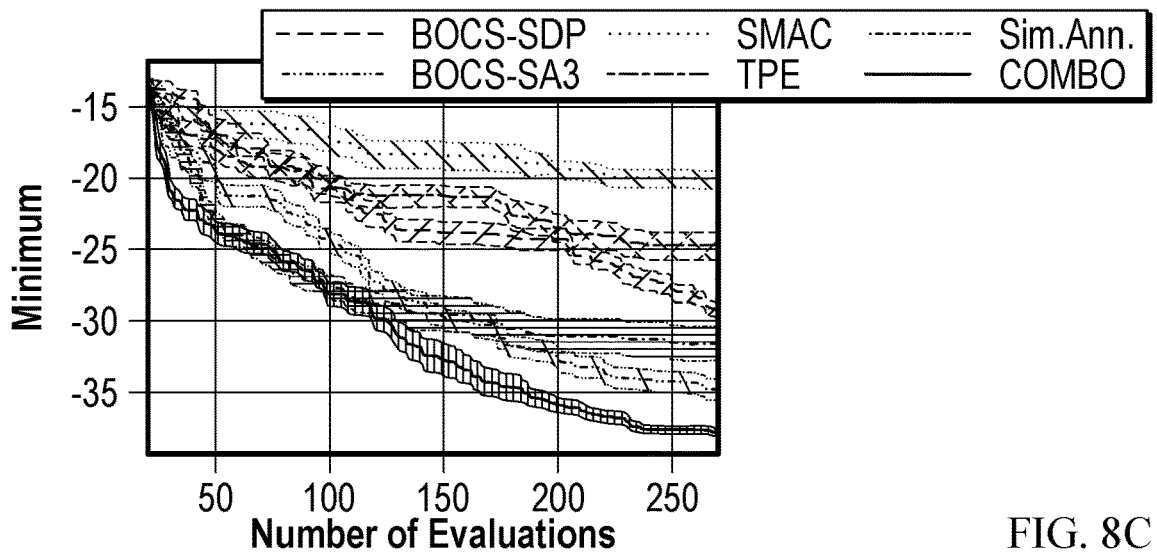
Figure 8D:
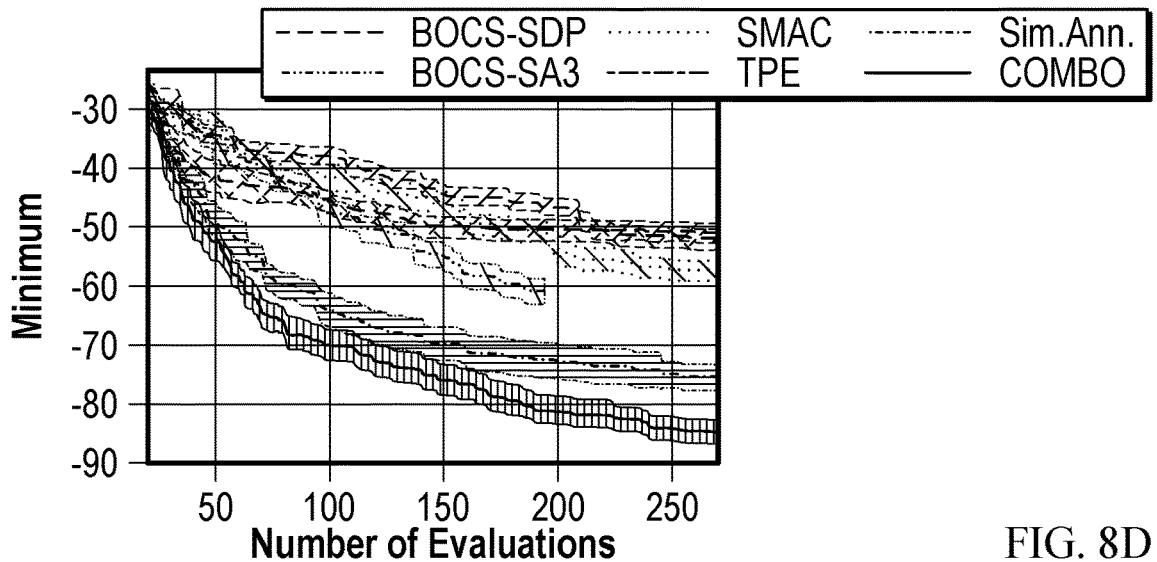
Figure 8E:
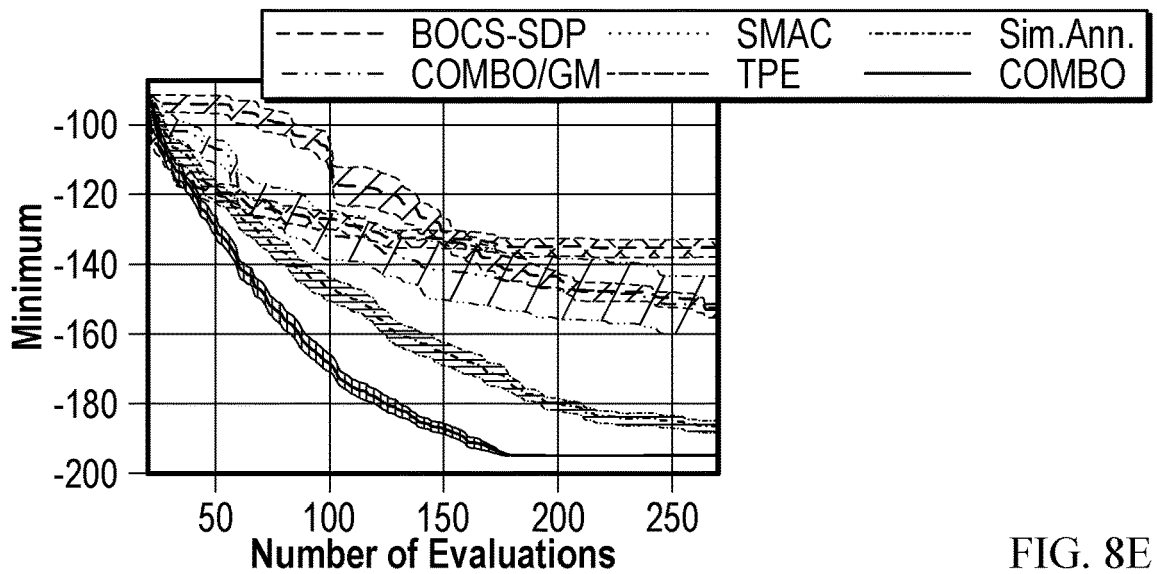

FIG. 8B shows that combinatorial Bayesian optimization is significantly faster than other methods, and FIGS. 8C-8E shows that combinatorial Bayesian optimization converges faster at nearly all problem sizes and number of evaluations.

Figures 9A, 9B:
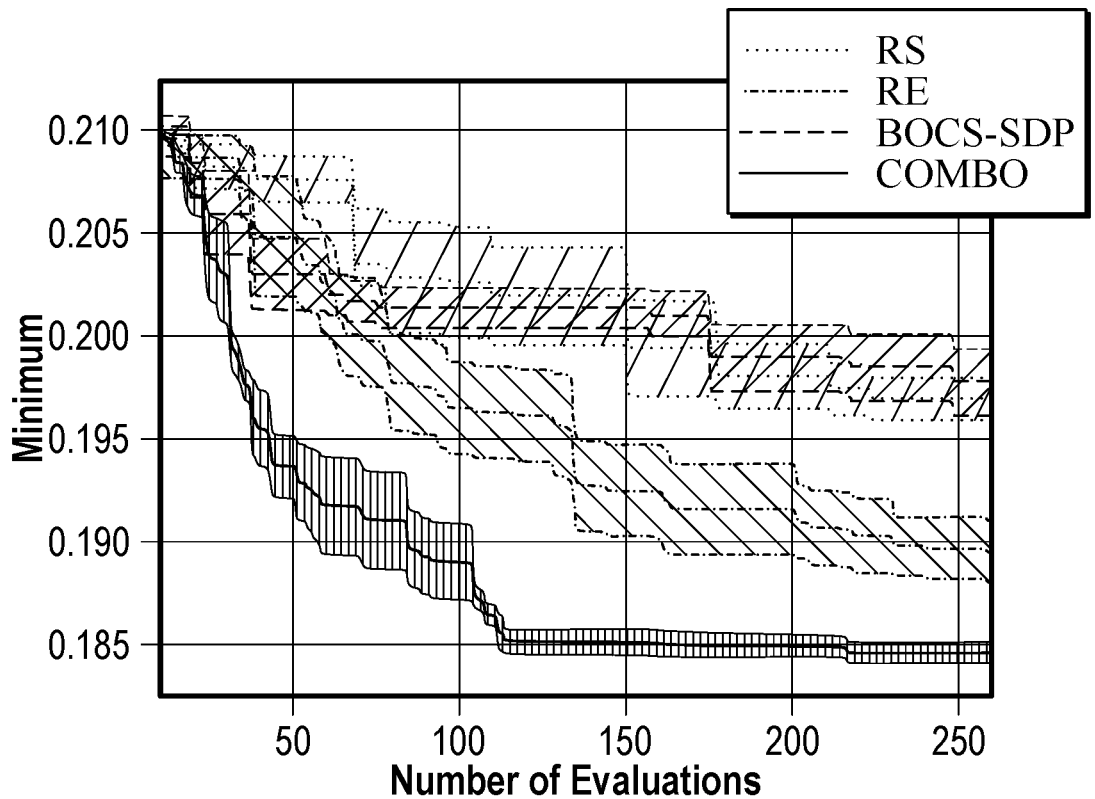
FIGS. 9A and 9B depict further example results comparing the methods of combinatorial Bayesian optimization described herein versus other conventional optimization methods for a neural architecture search optimization problem.

FIGS. 9A and 9B depict further example results comparing combinatorial Bayesian optimization, as described herein, versus other conventional optimization methods. In particular, FIGS. 9A and 9B relate to a neural architecture search optimization problem.

Neural architecture search (NAS) problems are typical combinatorial optimization problems. In this example, combinatorial Bayesian optimization is compared with BOCS as well as Regularized Evolution (RE), which is one of the most successful evolutionary search algorithms for NAS. Random Search (RS) is further included as a comparison since it can be competitive in well-designed search spaces.

For the considered NAS problem, the aim is to find the optimal cell comprising one input node (IN), one output node (OUT) and five possible hidden nodes (H1-H5). Connections from IN to all other nodes are allowed, from H1 to all other nodes, and so one, but connections that could cause loops are excluded.

An example of connections within a cell is depicted on the left side of the table in FIG. 9A, where the input state IN connects to H1, H1 connects to H3 and OUT, and so on. The input state and output state have identity computation types, whereas the computation types for the hidden states are determined by combination of two binary choices from the table on the right side of the table in FIG. 9A. In total, the search space consists of 31 binary variables, including 21 for the connectivities and 2 for the five computation types.

The objective of this example NAS problem is to minimize the classification error on validation set of CIFAR10 (a publicly available labeled image database) with a penalty for the amount of FLOPs necessary for a neural network constructed with a given cell. Thus, the optimization problem seeks to find an architecture that balances accuracy and computational efficiency. In each evaluation, a cell is constructed, and then a stack of three cells is joined to build a final neural network.

As depicted in FIG. 9B, combinatorial Bayesian optimization outperforms other methods significantly. BOCS-SDP and RS exhibit similar performance, confirming that for NAS modeling, high-order interactions between variables is significant. Furthermore, combinatorial Bayesian optimization outperforms the specialized RE, one of the most successful evolutionary search (ES) algorithms shown to perform better on NAS than reinforcement learning (RL) algorithms. Notably, when increasing the number of evaluations to 500, RE still cannot reach the performance of combinatorial Bayesian optimization with 260 evaluations.

Conventionally, Bayesian optimization has not been used on combinatorial structures, such as with NAS problems. Combinatorial Bayesian optimization's performance suggests that a well-designed general combinatorial Bayesian optimization can be competitive or even better in NAS problems than ES and RL, especially when computational resources are constrained.

Since combinatorial Bayesian optimization is applicable to any set of combinatorial variables, its use in NAS is not restricted to the typical NASNet search space.

Notably, combinatorial Bayesian optimization can optimize continuous variables by discretization, as shown in the ordinal variable problem discussed respect to FIGS. 6A and 6B. Thus, the results of FIGS. 6A, 6B, 9A, and 9B demonstrate that combinatorial Bayesian optimization is capable of jointly optimizing a neural network architecture and hyperparameter learning, which cannot be accomplished with conventional methods.

The sample problems and results discussed above with respect to FIGS. 5A, 5B, 6A, 6B, 7A, 7B, 8A, 8B, 8C, 8D, 8E, 9A, and 9B are not in any way limiting on the applications and performance of combinatorial Bayesian optimization. However, the results show that combinatorial Bayesian optimization consistently outperforms conventional methods in accuracy, number of evaluations to convergence, and time to convergence. These improvements result in complimentary performance improvements in processing systems (such as described with respect to FIG. 10) implementing combinatorial Bayesian optimization. For example, a smaller number of queries results in lower costs of the optimization process and a better utilization of the optimized object. As a result, on-board resources may be reduced while still performing complex problem optimization.

Example Processing Systems for Performing Combinatorial Bayesian Optimization

Figure 10:
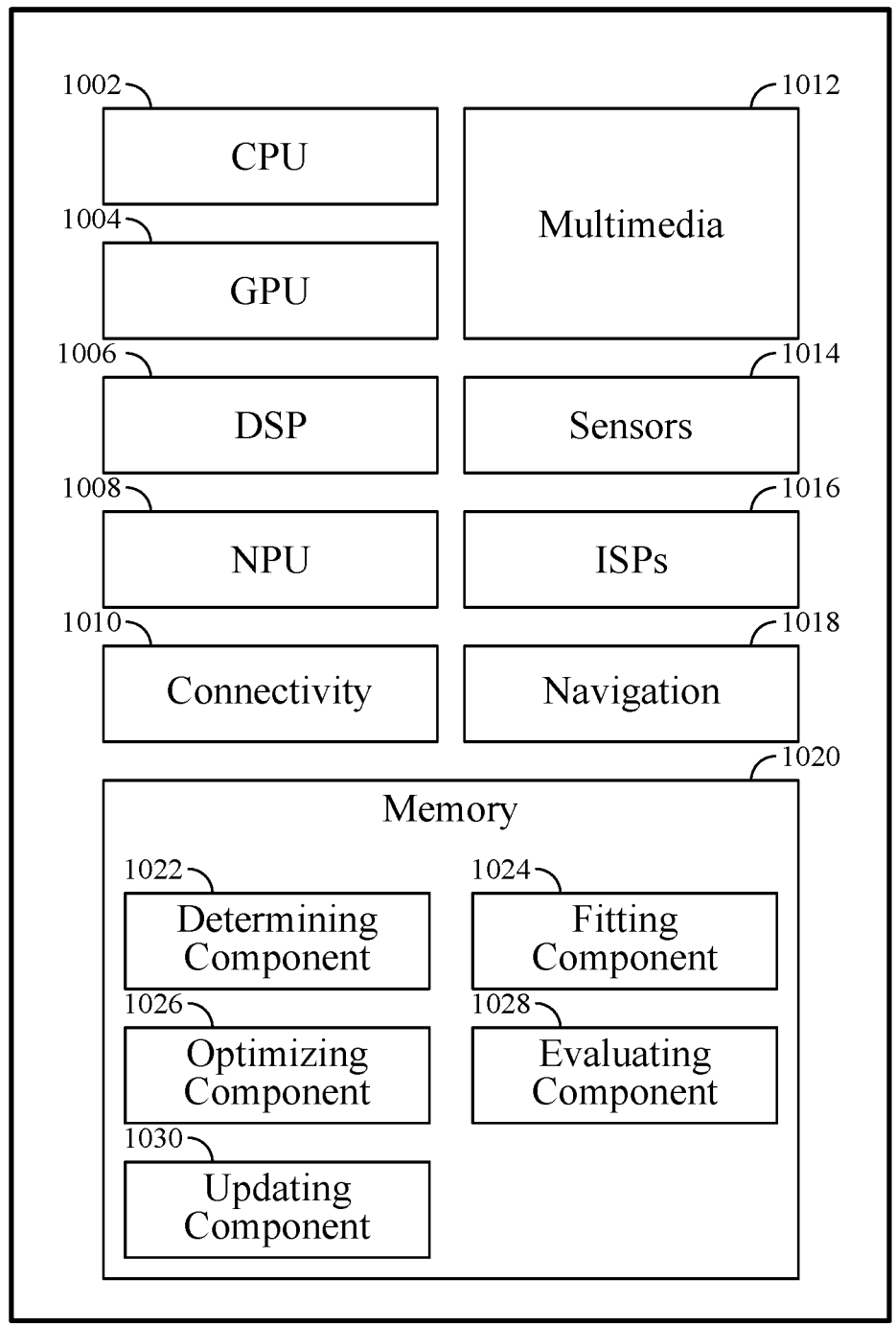
FIG. 10 depicts an example processing system that may be configured to perform the various aspects described herein.

FIG. 10 depicts an example processing system 1000, which may be configured to perform the various aspects described herein.

In this example, SOC 1000 includes a central processing unit (CPU) 1002, which may be a single- or multi-core CPU configured to perform combinatorial Bayesian optimization, in accordance with certain aspects of the present disclosure. Variables described herein, may be stored in a memory block associated with a neural processing unit (NPU) 1008, in a memory block associated with a CPU 1002, in a memory block associated with a graphics processing unit (GPU) 1004, in a memory block associated with a digital signal processor (DSP) 1006, in a memory block 1018, or may be distributed across multiple blocks. Instructions executed at the CPU 1002 may be loaded from a program memory associated with the CPU 1002 or may be loaded from a memory block 1018.

The SOC 1000 may also include additional processing blocks tailored to specific functions, such as a GPU 1004, a DSP 1006, a connectivity block 1010, which may include fifth generation (5G) connectivity, fourth generation long term evolution (4G LTE) connectivity, Wi-Fi connectivity, USB connectivity, Bluetooth connectivity, and the like, and a multimedia processor 1012 that may, for example, detect and recognize gestures.

In some embodiments, the NPU is implemented in the CPU 1002, DSP 1006, and/or GPU 1004. The SOC 1000 may also include a sensor processor 1014, image signal processors (ISPs) 1016, and/or navigation module 1018, which may include a global positioning system.

In some embodiments, memory 1020 may comprise various process modules or components, such as a determining component 1022, fitting component 1024, optimizing component 1026, evaluating component 1028, and updating component 1030, which are configured to perform process steps, such as those described above with respect to the method of FIG. 4. Notably, these are just a few example components, and components consistent with any functions described herein may be stored in memory 1018 and executed by any of the processing units of SOC 1000.

In some embodiments, the SOC 1000 may be based on an ARM instruction set. In an aspect of the present disclosure, the instructions loaded into the CPU 1002 may comprise code to search for a stored multiplication result in a lookup table (LUT) corresponding to a multiplication product of an input value and a filter weight. The instructions loaded into the CPU 1002 may also comprise code to disable a multiplier during a multiplication operation of the multiplication product when a lookup table hit of the multiplication product is detected. In addition, the instructions loaded into the CPU 1002 may comprise code to store a computed multiplication product of the input value and the filter weight when a lookup table miss of the multiplication product is detected.

SOC 1000 and/or components thereof may be configured to perform the methods described herein.

EXAMPLE CLAUSES

The following are example embodiments. Even if single claim dependencies are indicated in the following examples, or in the claims below, all claim dependencies, including multiple claim dependencies, are included within the scope of the present disclosure.

Clause 1: A method for determining a solution to a combinatorial Bayesian optimization problem based on a plurality of combinatorial variables, comprising: determining a plurality of subgraphs, wherein each subgraph of the plurality of subgraphs corresponds to a combinatorial variable of the plurality of combinatorial variables; determining a combinatorial graph based on the plurality of subgraphs; determining evaluation data comprising a set of vertices in the combinatorial graph and evaluations on the set of vertices; fitting a Gaussian process to the evaluation data; determining an acquisition function for vertices in the combinatorial graph using a predictive mean and a predictive variance from the fitted Gaussian process; optimizing the acquisition function on the combinatorial graph to determine a next vertex to evaluate; evaluating the next vertex; updating the evaluation data with a tuple of the next vertex and its evaluation; and determining a solution to the problem, wherein the solution comprises a vertex of the combinatorial graph.

Clause 2: The method of Clause 1, wherein determining a combinatorial graph based on the plurality of subgraphs comprises determining a graph Cartesian product of the plurality of subgraphs.

Clause 3: The method of any one of Clauses 1-2, wherein updating the Gaussian process comprises determining an automatic relevance determination (ARD) diffusion kernel.

Clause 4: The method of Clause 3, wherein determining the ARD diffusion kernel comprises: calculating a graph Fourier transform for each sub-graph of the plurality of subgraphs.

Clause 5: The method of Clause 3, wherein: the plurality of combinatorial variables comprises m combinatorial variables $\{C_i\}_{i=1\ldots m}$, the plurality of subgraphs comprises m subgraphs, $\{G_i\}_{i=1\ldots m}$, $\beta$ is a sampled parameter, and the ARD diffusion kernel $K=\otimes_{i=1}^{m} \exp(-\beta L(G_i))$.

Clause 6: The method of Clause 3, wherein: the plurality of combinatorial variables comprises m combinatorial variables $\{C_i\}_{i=1\ldots m}$, the plurality of subgraphs comprises m subgraphs $\{G_i\}_{i=1\ldots m}$, $\beta_i$ is a sampled parameter associated with the ith subgraph $G_i$, and the ARD diffusion kernel $K=\otimes_{i=1}^{m} \exp(-\beta_i L(G_i))$.

Clause 7: The method of Clause 3, wherein updating the Gaussian process further comprises using slice sampling.

Clause 8: The method of Clause 3, further comprising: using a Horseshoe prior as a scale parameter in the ARD diffusion kernel.

Clause 9: The method of any one of Clauses 1-8, wherein the set of vertices comprises a random selection from a plurality of vertices in the combinatorial graph.

Clause 10: The method of any one of Clauses 1-9, wherein the solution represents a configuration for learning a neural network.

Further embodiments relate to processing systems configured to perform the methods described with respect to the preceding embodiments, as well as generally described herein, as well as non-transitory computer-readable mediums comprising computer-executable instructions that, when executed by a processor of a device (such as described with respect to FIG. 10), cause the device to perform the methods described with respect to the preceding embodiments, as well as generally described herein.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for determining optimized neural network architectures, comprising:
   receiving a plurality of combinatorial variables as input to an optimization process, each respective combinatorial variable of the plurality of combinatorial variables corresponding to a respective hyperparameter for training a neural network architecture;
   determining a plurality of subgraphs, wherein each subgraph of the plurality of subgraphs corresponds to a combinatorial variable of the plurality of combinatorial variables;
   determining a combinatorial graph based on the plurality of subgraphs, wherein the combinatorial graph comprises a plurality of vertices;
   determining evaluation data comprising a set of vertices from the plurality of vertices in the combinatorial graph and evaluations on the set of vertices;
   fitting a Gaussian process to the evaluation data, wherein the fitted Gaussian process comprises a predictive mean and a predictive variance;
   determining an acquisition function for vertices in the combinatorial graph using the predictive mean and the predictive variance from the fitted Gaussian process;
   adjusting the acquisition function on the combinatorial graph to determine a next vertex to evaluate;
   evaluating the next vertex;
   updating the evaluation data with a tuple of the next vertex and the evaluation of the next vertex; and
   providing a vertex of the combinatorial graph, based on the updated evaluation data, as a solution to the optimization process, wherein:
   the vertex indicates, for each respective combinatorial variable of the plurality of combinatorial variables, a respective value; and
   the indicated values of the plurality of combinatorial variables are used as the hyperparameters for the neural network architecture.

2. The method of claim 1, wherein determining a combinatorial graph based on the plurality of subgraphs comprises determining a graph Cartesian product of the plurality of subgraphs.

3. The method of claim 1, wherein fitting the Gaussian process comprises determining an automatic relevance determination (ARD) diffusion kernel.

4. The method of claim 3, wherein determining the ARD diffusion kernel comprises: calculating a graph Fourier transform for each sub-graph of the plurality of subgraphs.

5. The method of claim 3, wherein:
   the plurality of combinatorial variables comprises m combinatorial variables $\{C_i\}_{i=i \ldots m}$,
   the plurality of subgraphs comprises m subgraphs $\{G_i\}_{i=1 \ldots m}$,
   $\beta$ is a sampled parameter, and
   the ARD diffusion kernel $K = \otimes_{i=1}^{m} \exp(-\beta L(G_i))$.

6. The method of claim 3, wherein:
   the plurality of combinatorial variables comprises m combinatorial variables $\{C_i\}_{i=1 \ldots m}$,
   the plurality of subgraphs comprises m subgraphs $\{G_i\}_{i=1 \ldots m}$,
   $\beta_i$ is a sampled parameter associated with the ith subgraph $G_i$, and
   the ARD diffusion kernel $K = \otimes_{i=1}^{m} \exp(-\beta_i L(G_i))$.

7. The method of claim 3, wherein fitting the Gaussian process further comprises using slice sampling.

8. The method of claim 3, further comprising: using a Horseshoe prior as a scale parameter in the ARD diffusion kernel.

9. The method of claim 1, wherein the set of vertices comprises a random selection from the plurality of vertices in the combinatorial graph.

10. The method of claim 1, wherein the solution represents a configuration for learning a neural network.

11. A processing system configured to determine optimized neural network architectures, comprising:
    a memory comprising computer-executable instructions;
    one or more processors configured to execute the computer-executable instructions and cause the processing system to:
    receive a plurality of combinatorial variables as input to an optimization process, each respective combinatorial variable of the plurality of combinatorial variables corresponding to a respective hyperparameter for training a neural network architecture;

determine a plurality of subgraphs, wherein each subgraph of the plurality of subgraphs corresponds to a combinatorial variable of the plurality of combinatorial variables;

determine a combinatorial graph based on the plurality of subgraphs, wherein the combinatorial graph comprises a plurality of vertices;

determine evaluation data comprising a set of vertices from the plurality of vertices in the combinatorial graph and evaluations on the set of vertices;

fit a Gaussian process to the evaluation data, wherein the fitted Gaussian process comprises a predictive mean and a predictive variance;

determine an acquisition function for vertices in the combinatorial graph using the predictive mean and the predictive variance from the fitted Gaussian process;

adjust the acquisition function on the combinatorial graph to determine a next vertex to evaluate;

evaluate the next vertex;

update the evaluation data with a tuple of the next vertex and the evaluation of the next vertex; and provide a vertex of the combinatorial graph, based on the updated evaluation data, as a solution to the optimization process, wherein:

the vertex indicates, for each respective combinatorial variable of the plurality of combinatorial variables, a respective value; and the indicated values of the plurality of combinatorial variables are used as the hyperparameters for the neural network architecture.

12. The processing system of claim 11, wherein in order to determine a combinatorial graph based on the plurality of subgraphs, the one or more processors are further configured to determine a graph Cartesian product of the plurality of subgraphs.

13. The processing system of claim 11, wherein in order to fit the Gaussian process, the one or more processors are further configured to determine an automatic relevance determination (ARD) diffusion kernel.

14. The processing system of claim 13, wherein in order to determine the ARD diffusion kernel, the one or more processors are further configured to calculate a graph Fourier transform for each sub-graph of the plurality of subgraphs.

15. The processing system of claim 13, wherein:
the plurality of combinatorial variables comprises m combinatorial variables $\{C_i\}_{i=1 \ldots m}$,
the plurality of subgraphs comprises m subgraphs $\{G_i\}_{i=1 \ldots m}$,
$\beta$ is a sampled parameter, and
the ARD diffusion kernel $K = \otimes_{i=1}^{m} \exp(-\beta L(G_i))$.

16. The processing system of claim 13, wherein:
the plurality of combinatorial variables comprises m combinatorial variables $\{C_i\}_{i=1 \ldots m}$,
the plurality of subgraphs comprises m subgraphs $\{G_i\}_{i=1 \ldots m}$,
$\beta_i$ is a sampled parameter associated with the ith subgraph $G_i$, and
the ARD diffusion kernel $K = \otimes_{i=1}^{m} \exp(-\beta_i L(G_i))$.

17. The processing system of claim 13, wherein in order to fit the Gaussian process, the one or more processors are further configured to use slice sampling.

18. The processing system of claim 13, wherein the one or more processors are further configured to use a Horseshoe prior as a scale parameter in the ARD diffusion kernel.

19. The processing system of claim 11, wherein the set of vertices comprises a random selection from the plurality of vertices in the combinatorial graph.

20. The processing system of claim 11, wherein the solution represents a configuration for learning a neural network.

21. A non-transitory computer-readable medium comprising computer-executable instructions that, when executed by one or more processors of a processing system, cause the processing system to perform a method for determining optimized neural network architectures, the method comprising:

receive a plurality of combinatorial variables as input to an optimization process, each respective combinatorial variable of the plurality of combinatorial variables corresponding to a respective hyperparameter for training a neural network architecture;

determine a plurality of subgraphs, wherein each subgraph of the plurality of subgraphs corresponds to a combinatorial variable of the plurality of combinatorial variables;

determine a combinatorial graph based on the plurality of subgraphs, wherein the combinatorial graph comprises a plurality of vertices;

determine evaluation data comprising a set of vertices from the plurality of vertices in the combinatorial graph and evaluations on the set of vertices;

fit a Gaussian process to the evaluation data, wherein the fitted Gaussian process comprises a predictive mean and a predictive variance;

determine an acquisition function for vertices in the combinatorial graph using the predictive mean and the predictive variance from the fitted Gaussian process;

adjust the acquisition function on the combinatorial graph to determine a next vertex to evaluate;

evaluate the next vertex;

update the evaluation data with a tuple of the next vertex and the evaluation of the next vertex; and provide a vertex of the combinatorial graph, based on the updated evaluation data, as a solution to the optimization process, wherein:

the vertex indicates, for each respective combinatorial variable of the plurality of combinatorial variables, a respective value; and the indicated values of the plurality of combinatorial variables are used as the hyperparameters for the neural network architecture.

22. The non-transitory computer-readable medium of claim 21, wherein determining a combinatorial graph based on the plurality of subgraphs comprises determining a graph Cartesian product of the plurality of subgraphs.

23. The non-transitory computer-readable medium of claim 21, wherein fitting the Gaussian process comprises determining an automatic relevance determination (ARD) diffusion kernel.

24. The non-transitory computer-readable medium of claim 23, wherein determining the ARD diffusion kernel comprises: calculating a graph Fourier transform for each sub-graph of the plurality of subgraphs.

25. The non-transitory computer-readable medium of claim 23, wherein:
the plurality of combinatorial variables comprises m combinatorial variables $\{C_i\}_{i=1 \ldots m}$, the plurality of subgraphs comprises m subgraphs $\{G_i\}_{i=1\ldots m}$, $\beta$ is a sampled parameter, and the ARD diffusion kernel $K=\otimes_{i=1}^{m}\exp(-\beta L(G_i))$.

26. The non-transitory computer-readable medium of claim 23, wherein:

the plurality of combinatorial variables comprises m combinatorial variables $\{C_i\}_{i=1\ldots m}$, the plurality of subgraphs comprises m subgraphs $\{G_i\}_{i=1\ldots m}$, $\beta$ is a sampled parameter associated with the ith subgraph $G_i$, and the ARD diffusion kernel $K=\otimes_{i=1}^{m}\exp(-\beta_i L(G_i))$.

27. The non-transitory computer-readable medium of claim 23, wherein fitting the Gaussian process further comprises using slice sampling.

28. The non-transitory computer-readable medium of claim 23, wherein the method further comprises: using a Horseshoe prior as a scale parameter in the ARD diffusion kernel.

29. The non-transitory computer-readable medium of claim 21, wherein the solution represents a configuration for learning a neural network.

30. A processing system configured to determine optimized neural network architectures, comprising:

means for receiving a plurality of combinatorial variables as input to an optimization process, each respective combinatorial variable of the plurality of combinatorial variables corresponding to a respective hyperparameter for training a neural network architecture;

means for determining a plurality of subgraphs, wherein each subgraph of the plurality of subgraphs corresponds to a combinatorial variable of the plurality of combinatorial variables;

means for determining a combinatorial graph based on the plurality of subgraphs, wherein the combinatorial graph comprises a plurality of vertices;

means for determining evaluation data comprising a set of vertices from the plurality of vertices in the combinatorial graph and evaluations on the set of vertices;

means for fitting a Gaussian process to the evaluation data, wherein the fitted Gaussian process comprises a predictive mean and a predictive variance;

means for determining an acquisition function for vertices in the combinatorial graph using the predictive mean and the predictive variance from the fitted Gaussian process;

means for adjusting the acquisition function on the combinatorial graph to determine a next vertex to evaluate;

means for evaluating the next vertex;

means for updating the evaluation data with a tuple of the next vertex and the evaluation of the next vertex; and means for providing a vertex of the combinatorial graph, based on the updated evaluation data, as a solution to the optimization process, wherein:

the vertex indicates, for each respective combinatorial variable of the plurality of combinatorial variables, a respective value; and the indicated values of the plurality of combinatorial variables are used as the hyperparameters for the neural network architecture.

\* \* \* \* \*